United States Patent [19]
Walleman

[11] Patent Number: 6,041,819
[45] Date of Patent: Mar. 28, 2000

[54] VALVE SYSTEM PROVIDING SIMULTANEOUS RECIRCULATING FLUID FLOW AND PURGING

[75] Inventor: David A. Walleman, Reno, Nev.

[73] Assignee: Flow Technologies, Inc., Reno, Nev.

[21] Appl. No.: 08/904,106

[22] Filed: Jul. 31, 1997

[51] Int. Cl.$^7$ .................................................. F16K 11/07
[52] U.S. Cl. ........................................ 137/625.5; 137/240
[58] Field of Search .................................. 137/563, 240, 137/625.48, 625.5

[56] References Cited

U.S. PATENT DOCUMENTS

| | | | |
|---|---|---|---|
| 3,340,895 | 9/1967 | Osgood, Jr. et al. | 137/503 X |
| 3,403,695 | 10/1968 | Hopkins | 137/563 X |
| 3,572,366 | 3/1971 | Wiggins | 137/563 X |
| 3,973,583 | 8/1976 | Sorenson | 137/625.48 X |
| 4,064,898 | 12/1977 | Petersen | 137/240 |
| 4,129,150 | 12/1978 | Boisserand | 137/563 X |
| 4,627,465 | 12/1986 | Kolibas et al. | 137/563 |
| 4,958,659 | 9/1990 | Dowdall | 137/624.12 |
| 5,505,219 | 4/1996 | Lansberry | 134/105 |

*Primary Examiner*—John Fox
*Attorney, Agent, or Firm*—Robert Charles Hill

[57] ABSTRACT

A valve system that affords up stream isolation and recirculation of fluid flowing along a flow path, while simultaneously enabling a purge process to be performed is provided. The valve system allows recirculating fluid flow on a supply side thereof, while enabling componentry on a load side thereof to undergo maintenance, for maintaining the temperature and flow rate of supply side fluid. Upon completion of maintenance, setup or initialization time is reduced, since the supply fluid is continuously recirculating. Fluid flow rate and temperature are constant on the supply side, for reducing wear on temperature control devices. The supply side is preferably mechanically isolated from load side componentry during maintenance for eliminating contamination of critical components on the supply side, so that the system is suited for use with process equipment. The valve system includes a switch for switching the system from a normal position where fluid flows through the system, to a bypass position to isolate the load side from the supply side. In the bypass position, the supply fluid flow is recirculated, so that maintenance may be performed on load side componentry. Fluid in the load side may be discharged through drain means in the system. The switch preferably includes a purge activation control for controlling the purge process. The purge control admits a purge media into the load side under pressure for purging unwanted matter from the load side componentry.

15 Claims, 7 Drawing Sheets

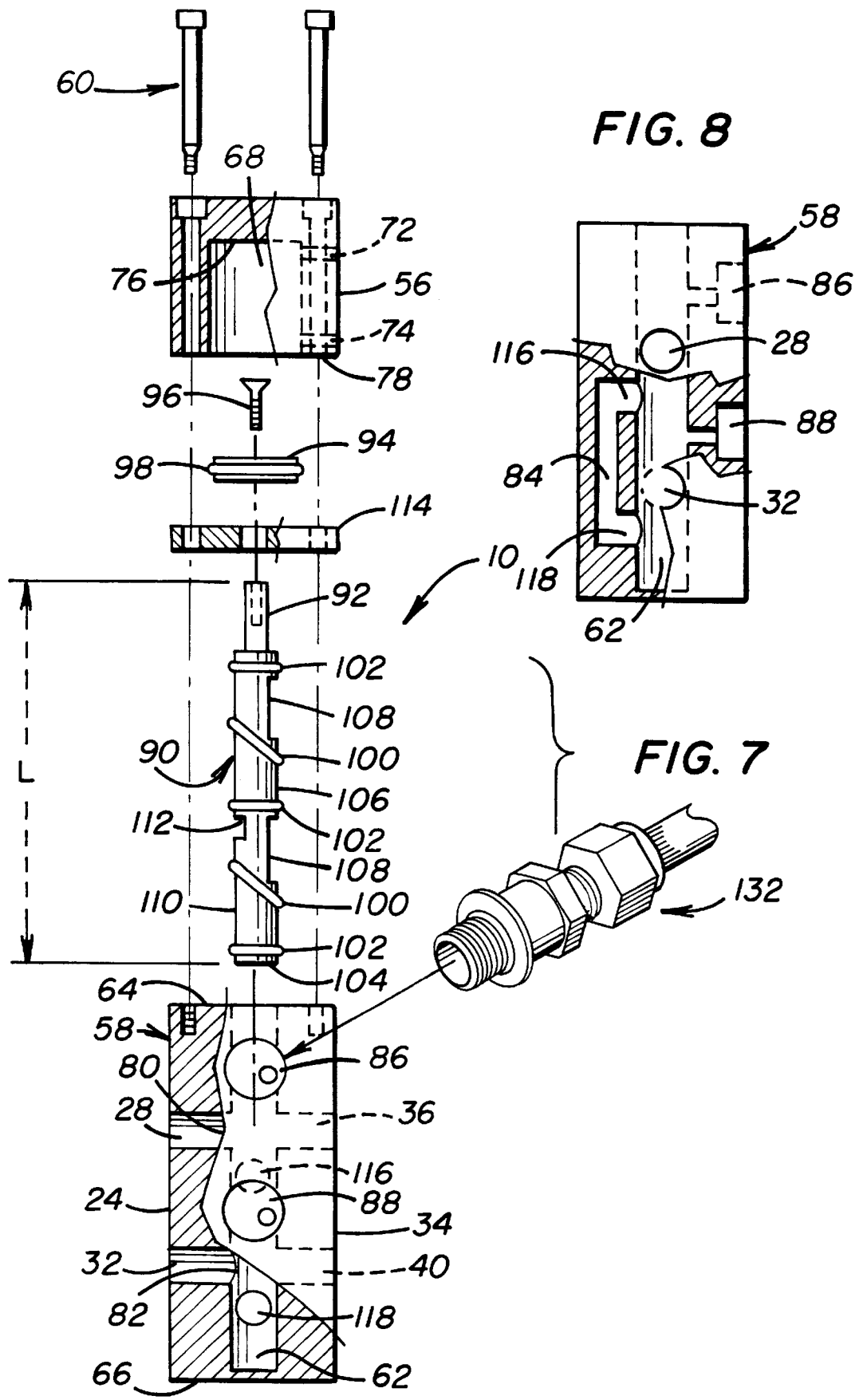

VALVE SYSTEM PROVIDING SIMULTANEOUS RECIRCULATING FLUID FLOW AND PURGING

BACKGROUND OF THE INVENTION

1. Field of the Invention

The present invention relates generally to process machinery, and more particularly, to a valve system that provides upstream isolation during purging and when not purging provides uninhibited recirculating fluid flow.

2. Description of Related Art

There are a number of devices in the prior art provided for controlling fluid flow. Fluid flow controlling devices are often used to control the rate of a desired fluid flowing through conduit for either cooling or heating processing machinery or articles being fabricated with the machinery. The fluid flows through the machinery, for either cooling or heating the machinery and any article produced thereby if desired, while the equipment is performing desired processing. However, over time the processing machinery, or conduit, or both, often become contaminated and cleaning of the processing machinery, or conduit, or both, and replacement of the fluid is needed.

One method of fluid removal and replacement may comprise first deactivating the processing machinery on both the supply and load sides. Once the processing machinery is deactivated, any required disassembly of the machinery or conduit to perform maintenance or replace portions of the conduit is performed. The fluid is then removed and the conduit or processing machinery may be cleaned if necessary, using known methods such as purging. The conduit and the machinery is reassembled, the fluid is replaced in the conduit and processing machinery, and the machinery is activated for processing.

An obvious disadvantage of the discussed method is that the processing machinery is deactivated while the fluid is being replaced and during cleaning of the conduit or machinery. With the processing machinery deactivated, processing is not performed and product output is potentially substantially reduced. Another disadvantage is that peripheral components provided to supply the fluid to the processing machinery, for example, may be adversely affected by the downtime of the machinery during the machinery or conduit cleaning.

A further disadvantage is that, often the fluid is maintained within a prescribed temperature range for maintaining the processing machinery at its optimal operating temperature. When the fluid is not circulating, the fluid tends to deviate from the prescribed temperature range. Thus, once the fluid is reintroduced into the processing machinery, there is an initialization time period wherein both the fluid flowing through the machinery and the machinery itself normalize toward the desired operating range. This further decreases the productivity time of the processing machinery and causes stress to devices for controlling the temperature of the fluid.

It therefore would be advantageous to provide a system that enables a purge process to be performed while simultaneously providing upstream isolation of the fluid flow and recirculating the fluid flow for maintaining the temperature of the fluid.

U.S. Pat. No. 5,505,219, to Lansberry et al., is directed to a supercritical fluid recirculating system for a precision inertial instrument parts cleaner. The disclosed system includes a fluid tight recirculating flow system including a parts holding chamber for holding parts to be cleaned. The fluid tight system directs supercritical carbon dioxide fluid flow across the parts being cleaned. A fluid recirculating cylinder has a first fluid port and a second fluid port connected in the flow system. A fluid piston is in the cylinder between the ports. A pneumatic cylinder has a further piston between a first pneumatic port and a second pneumatic port. A driving member is connected between the pistons for reciprocal movement caused by air from a source alternately introduced to the pneumatic ports to cause the fluid piston to pump fluid through the chamber and back to the recirculating cylinder. A plurality of one way valves are in the system to insure that the fluid pumped by the piston exhibits unidirectional flow through the chamber.

U.S. Pat. No. 4,958,659, to Dowdall, is directed to a pressuring and purging apparatus for pressurizing and purging an interior of an enclosure. The apparatus disclosed therein includes a purge valve for admitting gas to the enclosure at either a high flow rate or a low flow rate. A pneumatic control system for the purge valve includes a purge/power selector module. An enclosure pressure module and timing module are also provided. Each of the respective modules are mounted on respective faces of the purge valve body. The purge valve serves as a manifold for providing necessary connection of the control modules with each other and the enclosure interior for minimizing pipe connections.

U.S. Pat. No. 4,064,898, to Petersen et al., discloses and charge equipment that comprises a self-contained, portable apparatus that scrubs contamination from a sealed container and charges the scrubbed container with inert gas. The disclosed apparatus includes a housing for the apparatus, a gas reservoir, valves, and pneumatic logic for controlling the valves.

Although the devices disclosed in the above enumerated prior art references have improved features, there still exists a need for a valve system that provides upstream isolation and recirculating fluid flow, while simultaneously enabling a purge process to be performed.

OBJECTS OF THE INVENTION

It is therefore an object of the present invention to provide a valve system that provides upstream isolation and recirculation fluid flowing along a flow path, while simultaneously enabling a purge process to be performed;

It is another object of the present invention to provide a valve system that provides upstream isolation and recirculation of the fluid flow on one side of the flow path;

It is a further object of the present invention to provide a valve system that provides upstream isolation and recirculation of the fluid flow during a simultaneous purge process for maintaining the temperature and flow rate of the fluid;

It is still another object of the present invention to provide a valve system that provides upstream isolation and recirculation of the fluid flow during a simultaneous purge process for eliminating contamination of components coupled to the valve system during maintenance of the components;

It is a further object of the present invention to provide a valve system that provides upstream isolation and recirculation of the fluid flow during a simultaneous purge process for maintaining the temperature and flow rate of the fluid for reducing stress to the components;

It is yet another object of the present invention to provide a valve system that provides upstream isolation and recirculation of the fluid flow during a simultaneous purge process that reduces the initialization time period of components coupled thereto after maintenance of the components;

It is a still further object of the present invention to provide a valve system that provides upstream isolation and recirculation of the fluid flow during a simultaneous purge process that reduces disassembly of components coupled thereto required for maintenance of the components;

It is another object of the present invention to provide a valve system that provides upstream isolation and recirculation of the fluid flow during a simultaneous purge process that includes drain means for removing contaminated fluid from process machinery coupled thereto without contaminating the recirculating fluid; and It is yet a further object of the present invention to provide a valve system that provides upstream isolation and recirculation of the fluid flow during a simultaneous purge process for rapidly changing the temperature of the process components.

SUMMARY OF THE INVENTION

These and other objects and advantages of the present invention are achieved by providing a valve system that affords up stream isolation and recirculation of fluid flowing along a flow path, while simultaneously enabling a purge process to be performed. The invented valve system allows for recirculating fluid flow on a supply side thereof while process componentry or conduit on a load side thereof is undergoing maintenance procedures, while maintaining the temperature and flow rate of the supply side fluid. Thus, upon completion of process component or conduit maintenance, any setup or initialization time period for supplying the fluid to the process components is minimized.

Since fluid flow rate and temperature are maintained substantially constant on the supply side of the valve system, wear on temperature control devices for the fluid, such as chillers and heat exchangers is reduced. Additionally, the supply side of the invented valve system can be mechanically isolated from load side process componentry and conduit during maintenance procedures to eliminate contamination of critical components on the supply side during maintenance. Thus, the invented valve system is well suited for use with process equipment, such as semiconductor wafer fabrication, medical, and petrochemical equipment.

In the preferred embodiment, the valve system comprises a valve body having a supply side coupled to a fluid supply source, such as a reservoir and pump coupled with a fluid chiller or heat exchanger, and a load side coupled to conduit and process machinery, such as semiconductor wafer fabrication, medical, and petrochemical equipment. The fluid circulated by the invented system could be any as is commonly used in various industrial procedures. For example, fluids such as water, fluorinate, or deionized water and glycol. Alternatively, the circulated fluid may comprise a semisolid polyamide, photo resist, or other suitable polymers. Therefore, the term fluid for the purposes of describing the system of the present invention, incorporates each of the above mentioned fluids and semisolids along with appropriate alternative materials.

The system includes switch means for switching the valve body from a normal operating position, to a bypass position, wherein a load side flow path is isolated from a supply side flow path for isolating fluid flowing on the supply side from the load side. The switch means can be activated either manually or automatically. Thus, an operator can activate the switch means at their discretion for isolating the supply side fluid flow from the load side. Alternatively, a timer may be coupled to the switch means for automatically isolating and recirculating fluid flowing on the supply side, while purging load side process components and conduit. The supply side fluid flow is also preferably isolated from the load side while initializing the system to restore the load side fluid levels for processing.

In the normal operating position, fluid flows uninterrupted through the valve body of the invented system, for maintaining a prescribed operating temperature range of load side equipment, such as wafer fabrication, medical, and petrochemical equipment. Critical load side process componentry or conduit often requires periodic routine maintenance. Enabling maintenance to the critical componentry or conduit without interrupting recirculating supply fluid flow is achieved using the invented system by first activating the switch means to cause the valve body to switch from purge the normal position to the bypass position. When the valve system is in the bypass position, the supply fluid flow is recirculated back to the supply side source and prevented from entering the load side of the valve system.

The invented valve body is configured to maintain the flow rate of the fluid, for maintaining the temperature of the fluid and to prevent any interruption in recirculation of supply side fluid. The bypass position of the valve body allows maintenance to be performed on load side process componentry and conduit by preventing supply fluid from flowing into the load side of the valve body and through the equipment. In the bypass position, fluid remaining in the load side at the time of switching is usually discharged through a drain means in the valve body. Maintenance to any process componentry or conduit on the load side can then be performed without interrupting supply side fluid flow.

The present invention readily allows for maintenance procedures to be performed on supply side components and conduit as well as load side process components and conduit. Performing the steps similar to those disclosed above, particularly, draining the supply side fluid, while isolating the load side from the supply side and leaving the load side process components immersed in the heated or cooled fluid, maintenance procedures can be performed on the supply side components. By retaining the load side process components in fluid, the lubrication of the components is maintained, and the temperature of the fluid does not deviate substantially from its desired temperature, such as if the fluid from both the load and supply sides is changed. By maintaining the temperature of the fluid, stress on the load side and supply side process components is minimized, initialization and down time for the overall system is reduced, and contamination of the load side from the supply side is eliminated.

Additionally, while the valve body is in the bypass position, if it is desired to perform further cleaning of load side process equipment or conduit, a purge procedure may be initialized. In the preferred embodiment of the present invention, the switch means includes a purge activation switch for controlling the purge procedure. The switch means includes means for admitting a purge media, such as nitrogen, into the load side of the valve body under a pressure, preferably within the range of 40 to 80 p.s.i. and which is sufficient to purge unwanted particulate matter from the conduit and process components for discharge through the drain means in the valve body.

The purge media may be any gas or liquid known in the art that is suitable for the purge process. The purge media may simply push fluid and contaminants completely out of the load side and into a reservoir via the drain means, or may be required to loosen or dissolve particulate matter in the conduit or process componentry to clean the componentry and reduce hardening of the conduit. Therefore, the purge media preferably comprises any known purge media that is appropriate for use with the selected fluid circulated with the valve system for the process needs. For example, semisolids such as photo resist or polyamides require a purge media such as alcohol, while fluorinate or deionized water and glycol require a purge media of nitrogen.

The purge procedure provides an added benefit by allowing for rapid cooling or heating of the process components. In some cases, it is beneficial to the life of process components if they are first cooled or heated to a temperature proximal to the ambient atmosphere before exposure to that atmosphere. For instance, heating process components to the ambient temperature before removing them from their housing prevents condensation from forming on the components, thereby reducing stress on the components as well as minimizing repair time thereof.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 7 is a schematic, exploded view of the valve body of the valve system of the preferred embodiment of the present invention.

FIG. 8 is a vertical cross section through valve block 58 of FIG. 7 showing supply side channel 84.

DESCRIPTION OF THE PREFERRED EMBODIMENTS

Figure 1:
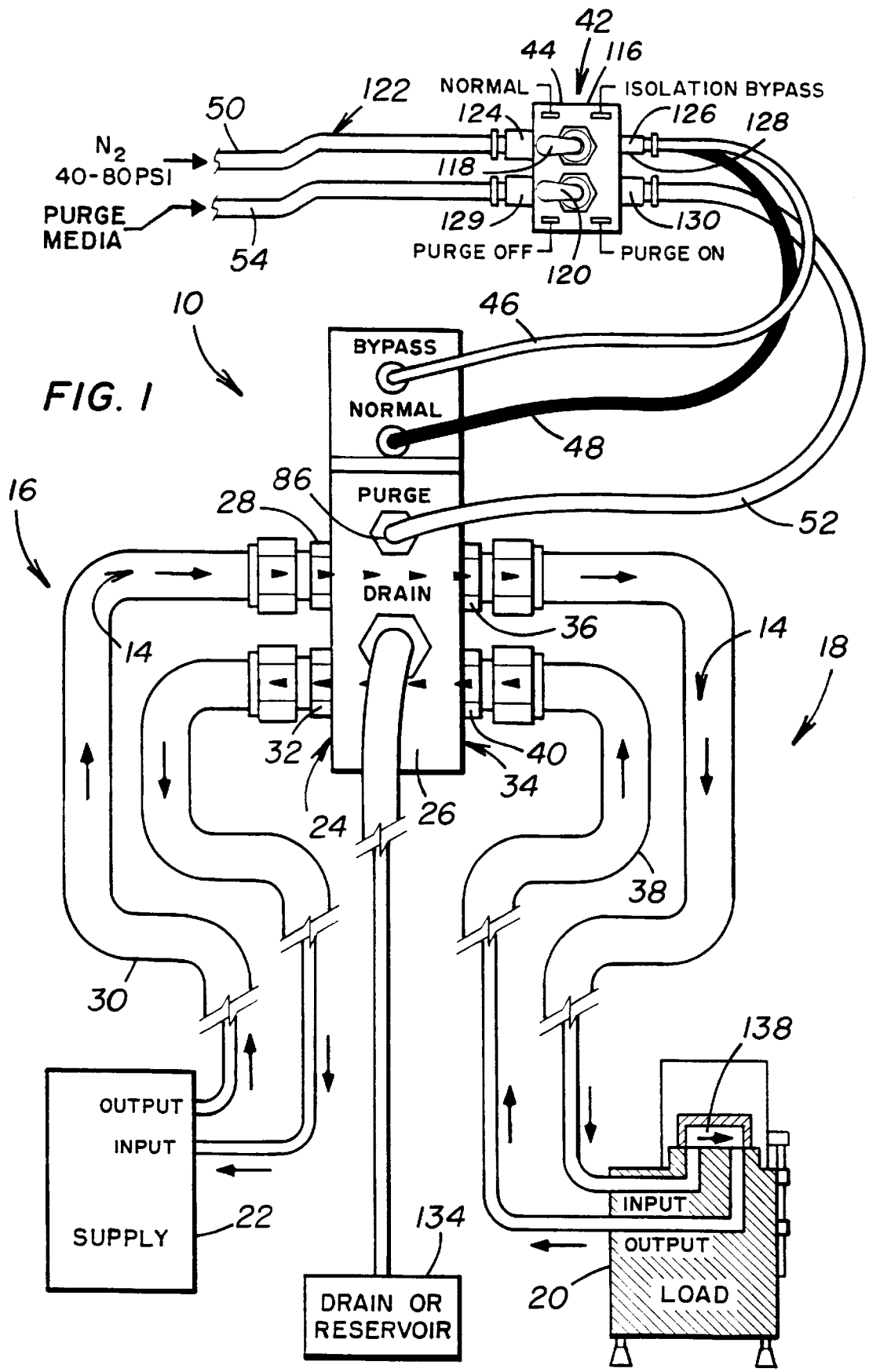
FIG. 1 is a schematic view showing the valve system of the preferred embodiment of the present invention in a normal operating mode.

The following description is provided to enable any person skilled in the art to make and use the invention and sets forth the best modes presently contemplated by the inventor of carrying out the invention. Various modifications, however, will remain readily apparent to those skilled in the art, since the generic principles of the present invention have been defined herein.

Referring now to FIGS. 1–4 of the drawings, there is shown generally at 10, a preferred embodiment of a valve system that affords multiple function modes of continuously recirculating fluid flow for the heating, cooling, and lubrication of process equipment, such as semiconductor wafer fabrication, medical, and petrochemical equipment. The system of the present invention 10 provides continuously recirculating fluid flow, of one or more fluids 12 such as water, fluorinate, or deionized water and glycol, or semisolids such as polyamide, photo resist, or other suitable polymers, along with appropriate alternative materials and combinations thereof, along a flow path 14.

The invented system 10 allows recirculating fluid flow along the flow path 14 between a supply side 16 and a load side 18 of the system 10. The system 10 also affords recirculating fluid flow along a supply side recirculating flow path 14S, while load side components 20 undergo maintenance. Recirculating the fluid 12 on the supply side 16 maintains the temperature and flow rate of the fluid 12 along the flow path 14S to reduce wear on the components of a supply source 22 for minimizing down time of the system 10 due to repairs on the load side process components 20. The supply source 22 may comprise a fluid reservoir and pumping means to generate and maintain fluid flow through a closed system.

In the preferred embodiment of the invented system 10, the supply side 16 of the system 10 includes a supply side 24 of a valve body 26 having an inflow aperture 28 coupled to the supply source 22, via a supply conduit 30, and an outflow aperture 32 also coupled to the source 22 via the conduit 30. The load side 18 of the system 10 includes a load side 34 of the valve body 26 having an outflow aperture 36 coupled to the load side componentry 20 via a load side conduit 38 and an inflow aperture 40 for receiving return fluid from the load side components 20. Thus, the supply side 16 of the invented system 10 comprises the supply source 22, inflow aperture 28, conduit 30, outflow aperture 32, and supply side 24 of the valve body 26, while the load side 18 consists of the load side 34 of the valve body 26, outflow aperture 36, inflow aperture 40, load side conduit 38, and process components 20.

FIGS. 1–4 illustrate a preferred method of operation of the invented valve system 10 which may be operated in several different modes. The valve system 10 provides operation in a normal fluid flow mode (shown in FIG. 1 and FIG. 5), a second mode, wherein upstream isolation and supply side recirculating fluid flow and load side stagnate fluid flow occur (shown in FIG. 2), a third mode, wherein upstream isolation and supply side recirculating fluid flow and load side fluid purging and draining occur (shown in FIG. 3 and FIG. 6), and upstream isolation and supply side recirculating fluid flow and load side stagnate fluid flow, wherein fluid is drained from the load side for allowing the removal and maintenance for load side process components (shown in FIG. 4).

Referring now to the drawing Figures, the invented valve system 10 comprises the valve body 26 that has its supply side 24 coupled to the supply source 22 and its load side 34 coupled to the load side components 20. Activation means 42, including a switch means 44, is coupled to the valve body 26 for controlling the operating mode thereof, such as by allowing the valve body 26 to operate in the normal mode, second mode wherein upstream isolation and supply side recirculating fluid flow and load side stagnate fluid flow occur, or third mode.

The switch means 44 is coupled to the valve body 26 via an isolation/bypass tube 46 and a normal tube 48, for conveying a valve control media 50, such as nitrogen ($N_2$)

or clean dry air (CDA) for example, to the valve body 26, and a purge tube 52, for conveying a purge media 54 to the valve body 26. The purge media 54 may be any gas or liquid known in the art that is suitable for the purge process. The purge media 54 may simply push fluid 12 and contaminants completely out of the load side components 20 and conduit 38, or may be required to loosen or dissolve particulate matter in load side conduit 38 or componentry 20 to clean the componentry 20 and reduce hardening of the conduit 38. Therefore, the purge media 54 preferably comprises any known purge media that is appropriate for use with the selected fluid 12 circulated by the valve system 10 for the process needs. For example, semisolids such as photo resist or polyamides require a purge media such as alcohol, while fluorinate or deionized water and glycol require a purge media of nitrogen.

Figure 5:
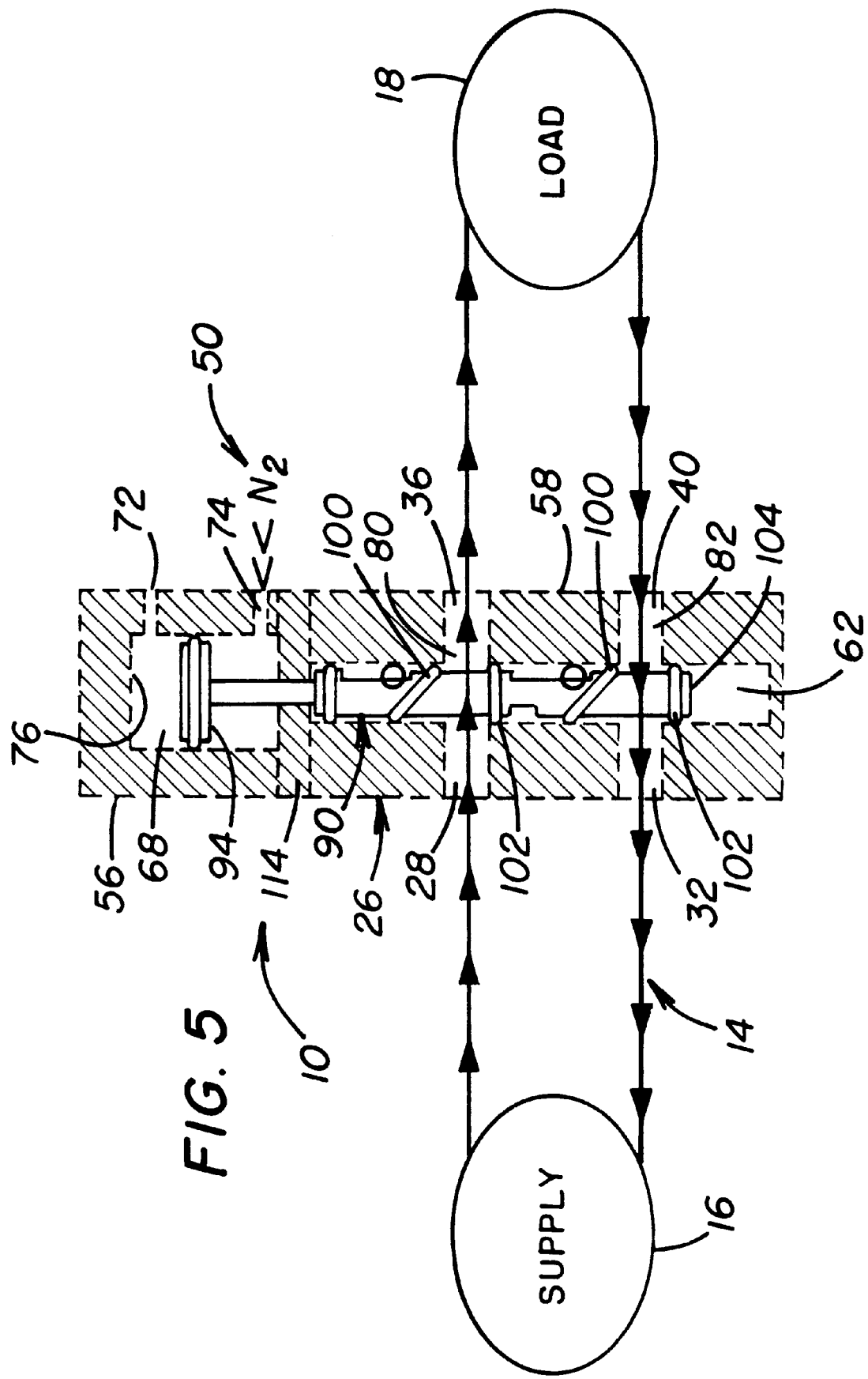
FIG. 5 is a schematic, side elevational view of a valve body of the valve system of the preferred embodiment in the normal operating mode, partially shown in cross section.
Figure 6:
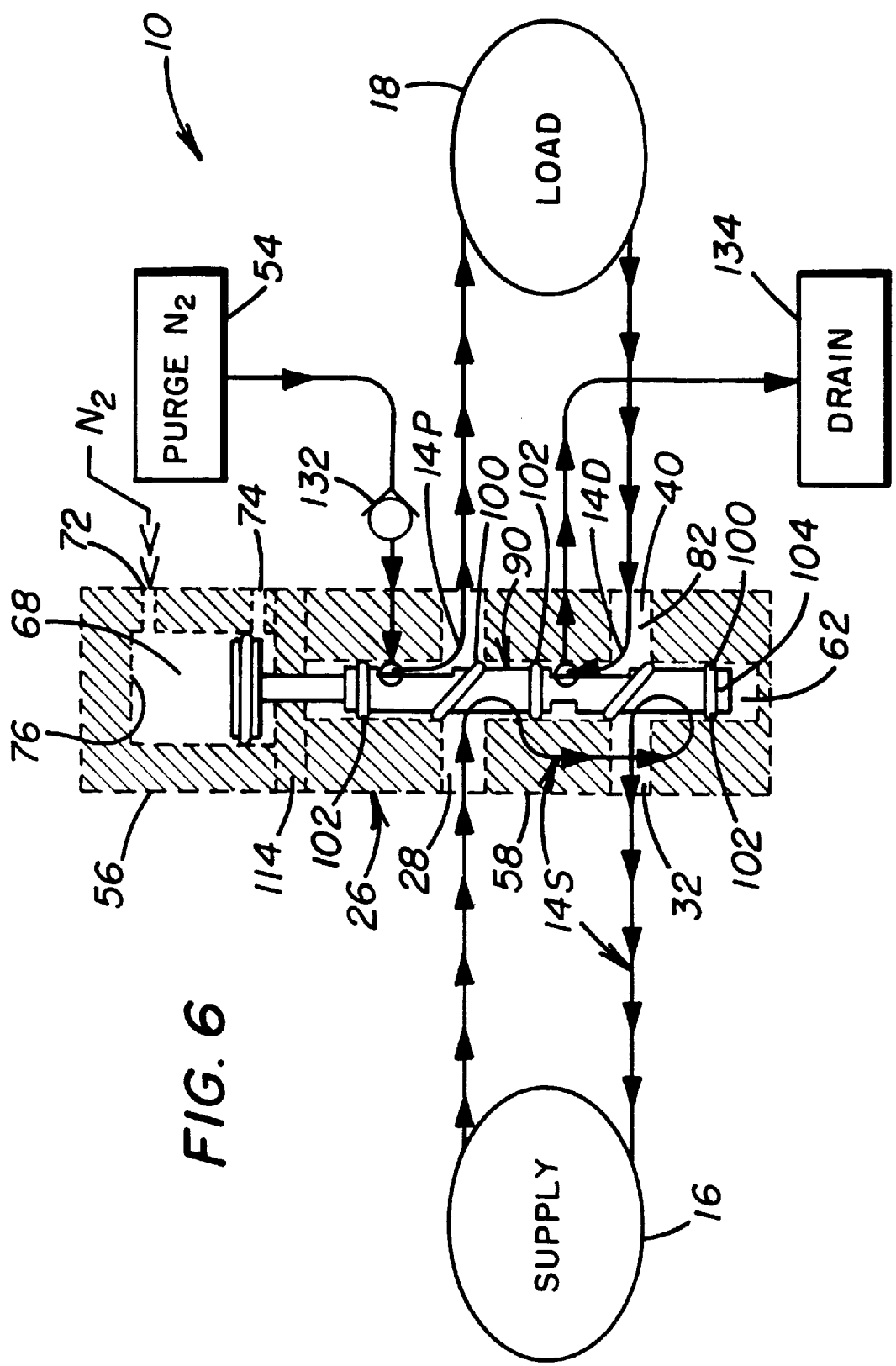
FIG. 6 is a schematic, side elevational view of the valve body of the valve system of the preferred embodiment in the isolation/bypass on and purge on operating mode, partially shown in cross section.

Referring particularly to FIGS. 5–7, the valve body 26 comprises a head 56 affixed to a block portion 58, using known means such as bolts 60. The block portion 58 is provided with an elongated passage 62 that extends substantially the length of the block 58, from a first end 64 toward a second end 66 thereof. A preferably cylindrical chamber 68 that communicates with the passage 62 is formed in the head 56. The valve control media 50 (shown in FIGS. 1–3) is coupled to a pair of valve control inlets 72, 74 that are formed though the head 56 and extend into the chamber 68. The valve control inlets 72, 74 couple to the valve control media 50 for activating and deactivating the valve system 10. A first one, or bypass, of the valve control inlets 72 is positioned adjacent to a top wall 76 of the chamber 68 and the second one, or normal, of the valve control inlets 74 is positioned adjacent to a bottom edge 78 of the chamber 68. Valve control media 50 is alternately fed into the inlets 72, 74 for actuating the invented system 10 between its operating modes.

The block 58 is configured with a first channel 80 extending between the inflow aperture 28 of the valve body's supply side 24 and the outflow aperture 36 of the valve body's load side 34, a second channel 82 extending between of the valve body's load side inflow aperture 40 on and the valve body's supply side outflow aperture 32, and a supply side channel 84 extending between the supply side apertures 28, 32. Each of the channels 80, 82, 84 are configured to enable fluid 12 to flow through the valve body 26 in an uninterrupted flow path 14 and at a desired flow rate. The block 58 is additionally provided with a purge input orifice 86 communicating with the passage 62 and a drain output aperture 88. The purge input 86 is coupled to the process componentry 20 for purging the process componentry 20 (discussed hereinafter), while the drain output 88 is provided for draining fluid 12 from either the supply side 16 or load side 18 of the system 10.

Referring still to FIGS. 5–7, and particularly to FIG. 7, an elongated shaft 90 is slidably retained in the passage 62 formed in the block 58. The shaft 90 has a connecting portion 92 configured to be affixed to a piston member 94 that is slidably retained in the cylindrical chamber 68. The piston 94 is fastened to the connecting portion 92 of the shaft 90 with conventional means, such as a screw 96. The piston 94 has an annular seal 98 that provides an air tight seal between the piston 94 and chamber 68. The shaft 90 is provided with a pair of angle seals, acting as flow diverters 100, that extend obliquely to a longitudinal axis L of the shaft 90. The diverters 100 are configured to seal the first 80 and second 82 channels and divert fluid 12 flowing into the supply side inflow aperture 28 into the supply side channel 84 and out the supply side outflow aperture 32 for recirculating the fluid 12 throughout the supply side 16 along the supply side flow path 14S. FIG. 8 shows how the supply side channel 84 connects to the elongated passage 62 through short connecting passages 116 and 118.

The shaft 90 is additionally provided with a plurality of channel seals 102 that extend substantially perpendicularly to the longitudinal axis L thereof. The channel seals 102 are positioned about on the shaft 90 to prevent fluid 12 from inadvertently entering the supply side channel 84 and drain output 88, when the shaft 90 is in normal operating mode, as shown in FIG. 5, for maintaining fluid flow rate through the valve body 26. In the preferred embodiment, the shaft 90 has a channel seal 102 interposed between the flow diverters 100, a seal 102 located adjacent to the connecting portion 92, and a seal 102 located adjacent to an end 104 of the shaft 90.

A load side 106 of the shaft 90 is provided with pair of grooves 108 formed therein. The grooves 108 aid with purging the process componentry 20 and draining contaminated fluid from the load side 18. When the shaft 90 is in an isolation/bypass position, the grooves 108 are sufficiently long to provide a purge flow path 14P between the purge input 86 and load side outflow aperture 36 via a portion of the passage 62 extending therebetween, for purging the process componentry 20 when desired, and a drain flow path 14D between the load side inflow aperture 40 and drain output aperture 88, when it is desired to drain contaminated fluid 12 from the load side 18. A supply side 110 of the shaft 90 is configured with a notch 112 to additionally aid with draining contaminated fluid 12.

A spacer 114 may be interposed between the block 58 and head 56. The spacer 114 provides a water and air tight seal between the head 56 and block 58.

The flow diverters 100 coact with the channels 80, 82, 84 to allow fluid 12 to flow along the appropriate flow paths 14, 14S, 14P, 14D, through the valve body 26 at the flow rate, when the shaft 90 is in either of the normal or isolation/bypass positions. Additionally, the diverters 110 mechanically isolate the supply side 16 of the invented valve system 10 from the load side 18 to eliminate contamination of critical components, such as the supply source 22. while maintenance procedures are performed on the load side componentry 20. Additionally, maintenance procedures may be carried out on the supply side 16 while the load side 18 contains stagnate fluid 12. Thus, the invented valve system 10 is well suited for use with process equipment, such as semiconductor wafer fabrication, medical, and petrochemical equipment, or other particulate matter sensitive equipment.

Referring again to FIGS. 1–4 of the drawings, the valve system 10 of the preferred embodiment of the present invention includes the activation means 42 for controlling the operating mode and purge process. The switch means 44 consists of a switch body 116 having a valve control switch 118 coupled to the valve control media 50 and isolation and bypass tubes 46, and normal tube 48 for controlling the position of the shaft 90 in the valve body 26. The switch body 116 also includes a purge control switch 120 coupled to the purge media 54 and to the purge input 86 via the purge tube 52.

Valve mode control is accomplished by diversion of the valve control media 50 into one of the two valve control inlets 72, 74, for actuating the shaft 90 between the normal and isolation/bypass modes. The purge process is executed by activation of the isolation/bypass mode and subsequent delivery of the purge media 54 to the valve body 26 and to the process components 20.

Specifically, valve control media 50 is supplied to the switch body 116 via valve control media line 122 and an input coupling 124. A pair of output couplings 126, 128 couples the valve control switch 118 to the bypass 72 and normal 74 inlets in the valve body 26, via the isolation/bypass tube 46 and normal tube 48. The valve control switch 118 is actuated to direct the valve control media 50 to the desired inlet 72, 74 for actuating the shaft 90 in the valve body 26 for changing the operating mode of the system 10.

In the preferred embodiment, when the valve control switch 118 is set to the normal position, the valve control media 50 flows through the switch body 116, out through the output coupling 126, and into the normal inlet 74 via the normal tube 48, for forcing the shaft 90 upwardly to the uninterrupted flow position (shown in FIG. 1). Alternatively, when the valve control switch 118 is set to the isolation/bypass mode position (FIG. 3), valve control media 50 flows to the switch body 116, through the output coupling 128, and into the bypass inlet 72, via the isolation/bypass tube 46, for forcing the shaft 90 downward in the valve body 26 so that the fluid 12 flows along the recirculating flow paths 14S, 14D, 14P.

Similarly, when the purge control switch 120 is set to the on position, the purge media 54 flows through an inlet coupling 129 coupled to the switch body 116, out through an output coupling 130, and into the purge input 86 in the valve body 22, via the purge tube 52. A check valve 132 is secured between the purge input 86 and tube 52 to prevent backflow of the purge media 54 along the purge tube 52 and toward the switch body 116.

Figure 2:
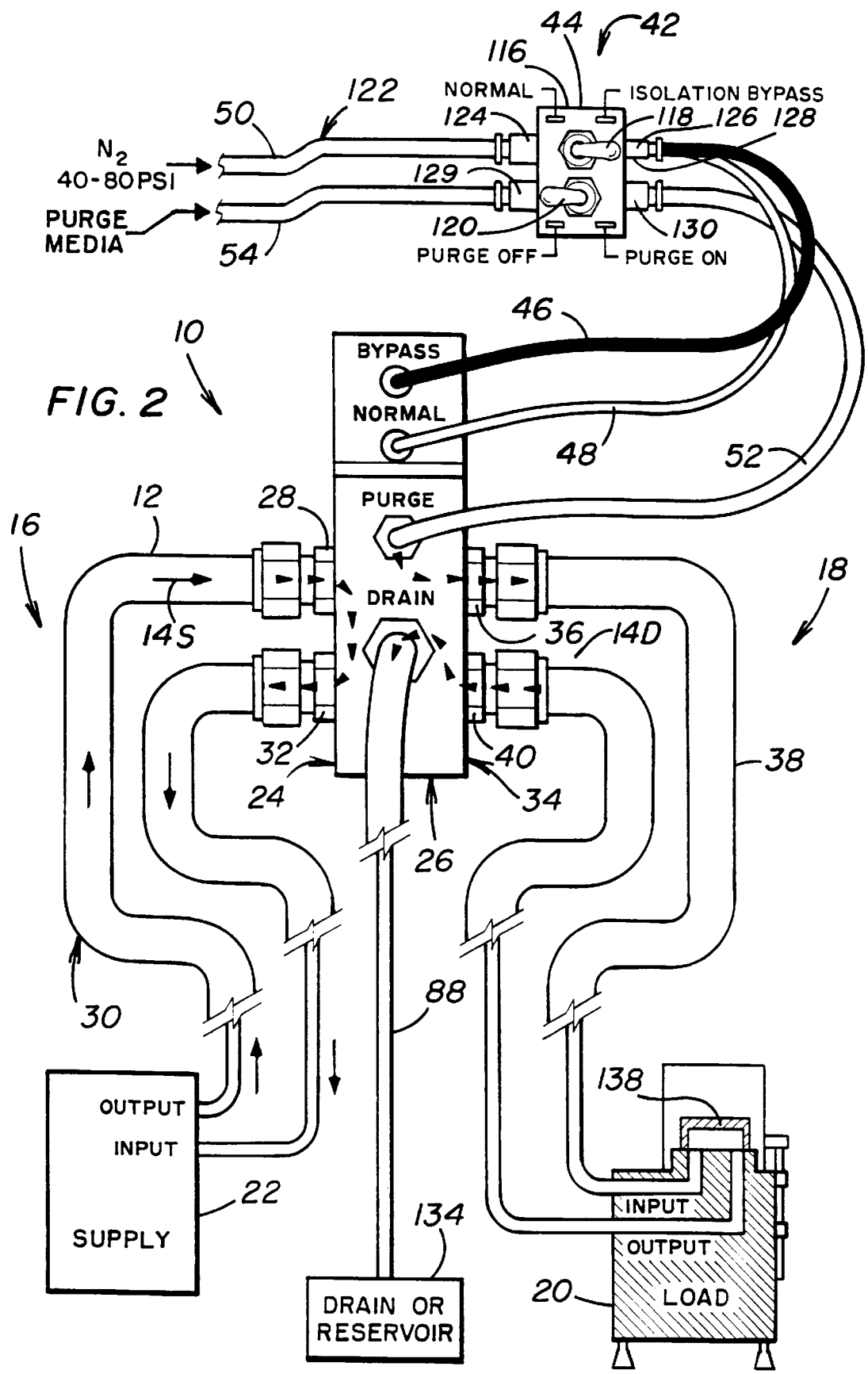
FIG. 2 is a schematic view showing the valve system of the preferred embodiment in an isolation/bypass on and purge off operating mode.

Referring to FIG. 2 and FIG. 7, after some operating time period, critical components 138 of the load side process componentry 20 often require routine maintenance. Enabling maintenance to the critical components 136 without interrupting supply fluid flow is achieved by adjusting the valve control switch 118 to the isolation/bypass position. When the switch 118 is adjusted to the isolation/bypass position, the valve control media 50 is discharged into the chamber 68 at bypass inlet 72 with sufficient pressure to force the piston 94 downward through the chamber 68, causing the shaft 90 to move from the normal position to the bypass position, as shown in FIG. 6. Preferably, the media 50 is emitted with a force ranging from approximately 40 p.s.i. to approximately 80 p.s.i.

When the shaft 90 is in the isolation/bypass position, the diverters 100 seal the first 80 and second 82 channels to direct contaminated fluid 12 from the process componentry 20 which enters the valve body 26 through the load side inflow aperture 36, along the drain flow path 14D into the drain output 88 and out of the valve body 26. The diverters 100 mechanically isolate the supply side 16 of the invented valve system 10 from load side 18 to eliminate contamination of critical components of the supply source 22, while maintenance procedures are performed on the process componentry 20. The diverters 100 direct the fluid 12 along the recirculating supply side flow path 14S, wherein fluid 12 flows into the supply side inflow aperture 28 into the supply side channel 84 and out the supply side outflow aperture 32 for recirculating the fluid 12 between the supply source 22 and the valve body's supply side 24 at the flow rate. The rate of fluid flow in the recirculating flow path 14S remains constant at the desired flow rate for maintaining the temperature of the fluid 12, to prevent any interruption in recirculation of supply side fluid, for reducing stress to the supply side components 22, and for eliminating contaminants from traveling to the supply side 16 of the system 10 from the load side 18.

Alternatively, fluid 12 may be allowed to stagnate on the load side 18 while maintenance procedures are performed on the supply source componentry 22. The heated or cooled stagnate fluid 12 on the load side 18 aids with maintaining and lubricating the process componentry 20. The temperature of the process componentry 20 does not change substantially rapidly with the fluid 12 retained therein thereby minimizing stress of the components 20 and reducing initialization and down times of the entire valve system 10. Furthermore, contamination from the supply side components 22 is substantially eliminated.

Figure 3:
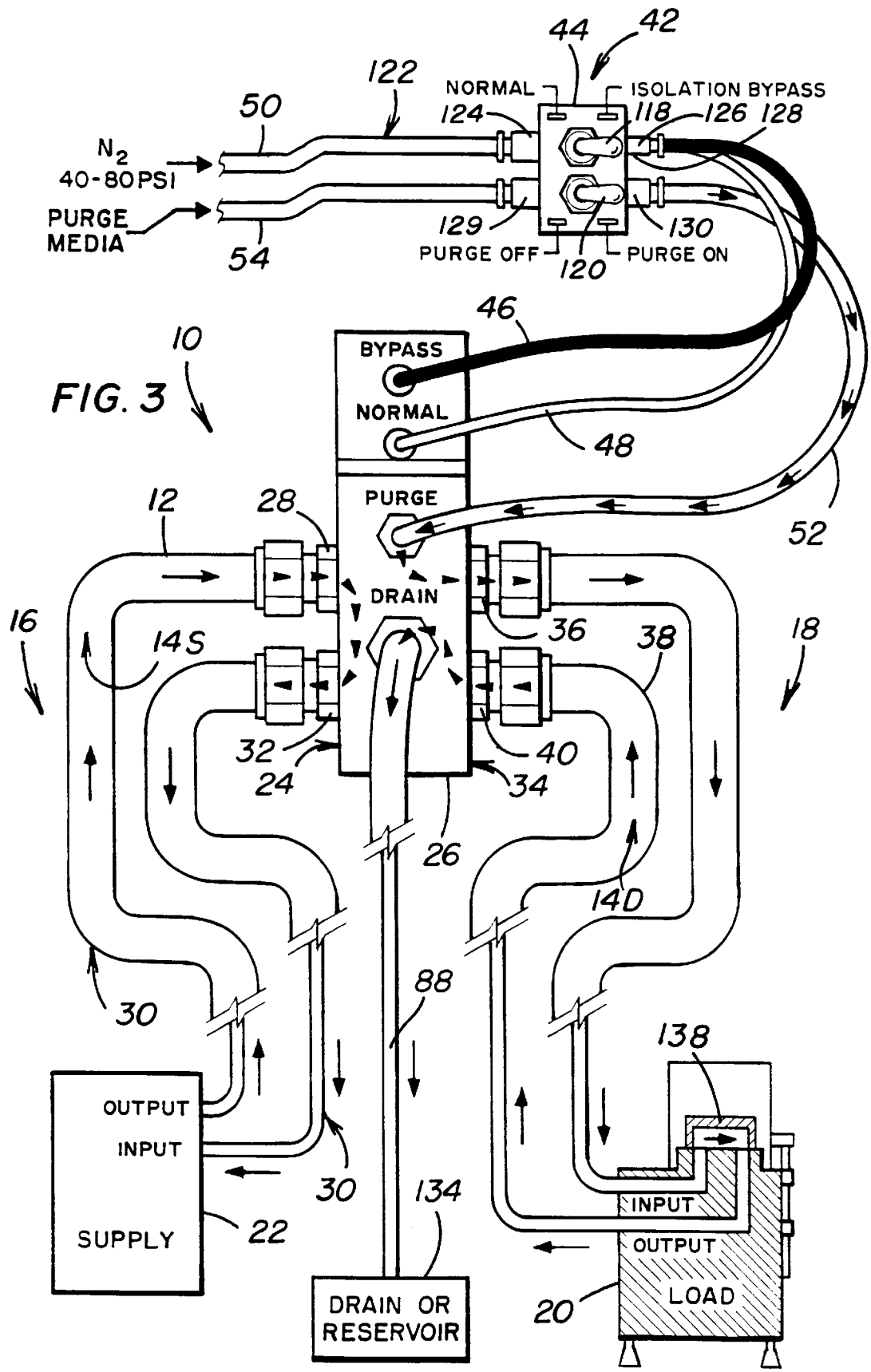
FIG. 3 is a schematic view showing the invented valve system in an isolation/bypass on and purge on operating mode.

Referring now to FIG. 3 of the drawings, if it is desired to perform cleaning of load side componentry 20, the purge procedure may be initialized. In the preferred embodiment of the valve system 10 present invention, the purge control switch 120 is set to the purge position, while the valve control switch 118 is maintained at the isolation/bypass position. When the purge control switch 120 is set to the purge position, the purge media 54 is discharged into the purge input 86 with sufficient pressure, approximately 40 to 80 p.s.i., to force the purge media 54 through load side componentry 20, for purging unwanted particulate matter and fluid 12 therefrom for cleaning the componentry 20. The unwanted particulate matter and fluid 12 are forced out of the load side 18 and out of the valve body 26 through the drain 88, and into a reservoir 134, for reprocessing of the fluid 12 if desired. The purge process is deactivated by adjusting the purge control switch 120 back to the purge-off position. The valve control switch 118 is then adjusted to the normal position and fluid 12 again flows through the valve body 26 along the normal flow path 14 in a substantially uninterrupted manner and at the flow rate.

Figure 4:
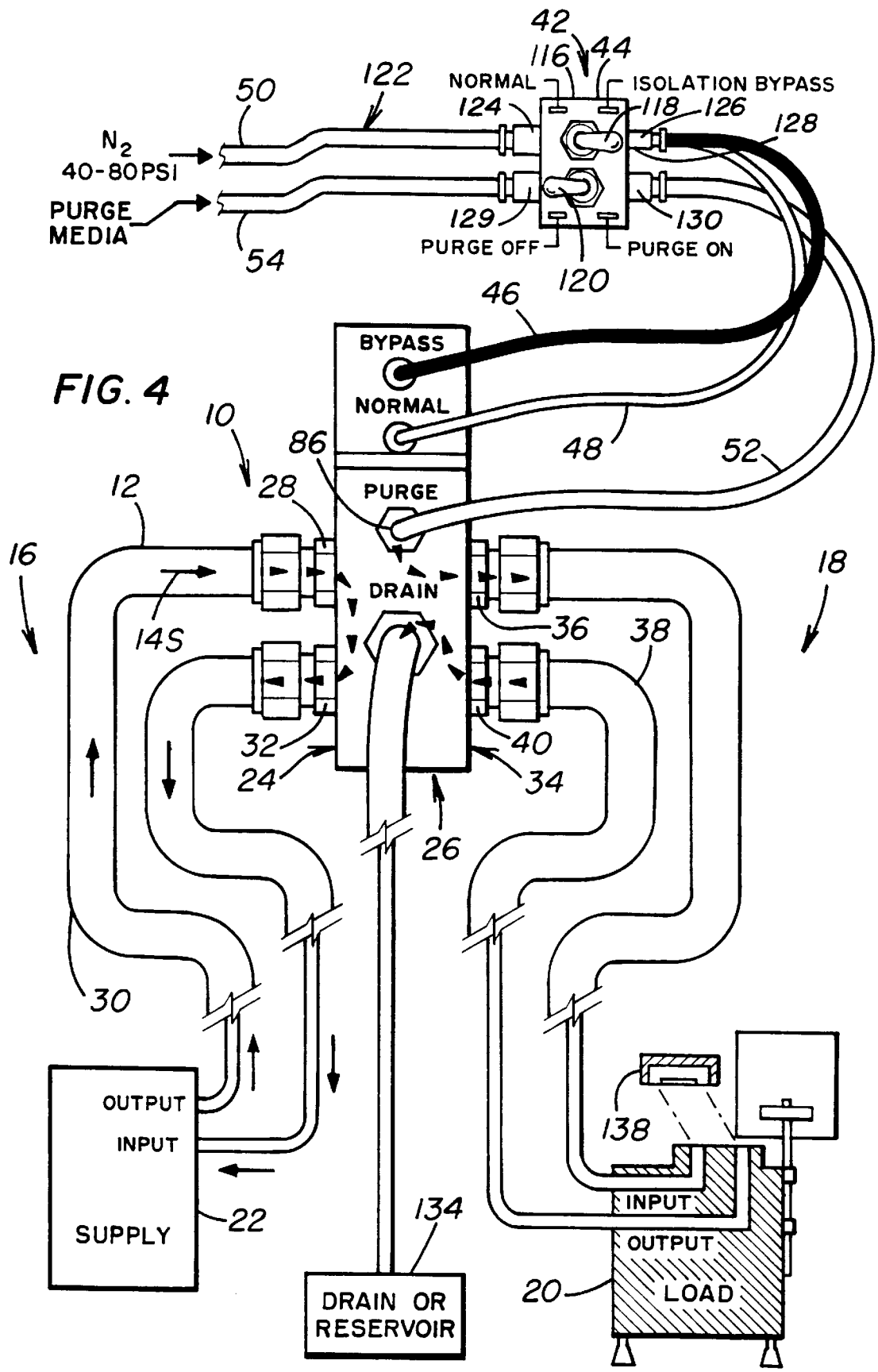
FIG. 4 is a schematic view showing the invented valve system in an isolation/bypass on and purge off operating mode, wherein purging is complete and process components may be removed.

Referring to FIG. 4, maintenance can be performed on load side components 20, including critical components 138 which can safely be removed from the general process components 20. Maintenance, such as replacement or cleansing can be performed on the conduit 38, as well as to the other load side components 20, while maintaining supply side temperature, flow rate, and flow pressure, since fluid 12 is recirculating along the supply side flow path 14S, while maintenance is performed on the load side 18 of the system 10. Additionally, the purge process may be used to control the temperature of process components 20 as it may be desirous to quickly adjust the temperature of the components 20 to the ambient temperature, before exposing the components 20 to the environment. By performing some of the previous steps, the purge process has the affect of quickly adjusting the temperature of the components 20 so that condensation or the like does not occur on the components 20.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A valve system comprising:
   a valve body having a supply side and a load side and flow control means for controlling fluid flow between the supply side and load side;
   said flow control means having only one moving member for allowing fluid to flow directly in a straight line from the supply side to the load side and back from the load side to the supply side through the valve body in a first portion and recirculating fluid through the supply side of the valve body in a second position; and activation means for moving the flow control means between the first and second positions.

2. The valve system of claim 1 further including purge means for purging componentry coupled to the load side of the valve body.

3. A valve system comprising:

a valve body having a supply side and a load side, the supply side coupled to a fluid supply source and the load side coupled to process componentry;

flow control means having only one moving member for controlling fluid flow, the flow control means allowing fluid to flow directly in a straight line from the supply side to the load side and back from the load side to the supply side through the valve body in a first position and isolating the supply side from the load side in a second position, the control means enabling fluid to recirculate between the fluid supply source and the supply side of the body when the control means is the second position;

activation means for moving the flow control means between the first and second positions, the activation means including purge means for controlling a purge process for purging the process componentry coupled to the load side of the valve body; and drain means for removing contaminated fluid from the process componentry coupled to the load side of the valve body.

4. The valve system of claim 3 wherein the activation means comprises a switch means for actuating the control means for controlling fluid flow through the valve body, the switch means including a purge control switch for controlling the purge process, the purge control switch coupled to a purge media source having sufficient pressure to purge componentry coupled to the load side of the valve body.

5. The valve system of claim 3 further comprising:

the supply side and load side of the valve body each having an inflow aperture and an outflow aperture for enabling fluid to recirculate through the valve body between the fluid supply source and process componentry, the valve body including a first channel coupling the supply side inflow aperture to the load side outflow aperture and second channel coupling the load side inflow aperture to the supply side outflow aperture for enabling fluid to flow directly in a straight line through the valve body at the flow rate; and the control means comprising a shaft movably retained in the valve body and extending through the first and second channels, the shaft including flow diverter members configured to allow fluid to flow through the first and second channels at the flow rate when the shaft is in the first position and to isolate the supply side from the load side when the shaft is in the second position, the flow diverter members diverting fluid into a supply side channel extending between the supply side inflow and outflow apertures for enabling fluid to recirculate between the supply source and the supply side of the valve body at the flow rate when the shaft is in the second position.

6. The valve system of claim 5 wherein the flow diverter members divert fluid from the load side to the drain means for removing the fluid from the load side when the control means is in the second position and preventing fluid from entering the supply side.

7. The valve system of claim 5 wherein the flow diverter members direct purge media into load side conduit coupled to the load side of the valve body for purging load side process componentry when the control means is in the second position.

8. A valve system comprising:

a valve body having a load side and a supply side, the supply side and load side of the valve body each having inflow and outflow apertures, the valve body having a first channel extending between an inflow aperture on the supply side and an outflow aperture on the load side, a second channel extending between an inflow aperture on the load side and an outflow aperture on the supply side, and a supply side channel extending between the supply side inflow and outflow apertures, each of the channels configured to enable fluid to flow through the valve body at a flow rate, the supply side of the valve body coupled to a fluid supply source and the load side coupled to process componentry;

flow control means for controlling fluid flow through the valve body, the control means allowing fluid to flow directly in a straight line through the valve body in a first position and causing fluid to recirculate through the supply side in a second position, the control means comprising a shaft movably retained in the valve body, the shaft including flow diverters extending obliquely to a longitudinal axis thereof, the diverters configured to seal the first and second channels and divert fluid flowing into the supply side inflow aperture into the supply side channel and out the supply side outflow aperture for recirculating the fluid between the supply source and supply side when the control means is in the second position;

activation means for actuating the control means and for controlling a purge process, the activation means including a first switch for actuating the control means between the first and second positions for controlling fluid flow through the valve body and a second switch for controlling the purge process, the second switch coupled to a purge media source having sufficient pressure to purge componentry coupled to load side of the valve body, when the control means is in the second position, the second switch activated for causing the purge media source to emit purge media, the diverters sealing the first and second channels for directing the gas through the load side of the valve body and into the load side process componentry to purge particulate matter and fluid from the componentry; and a drain fluid reprocessing output in the valve body for removing fluid from the process componentry coupled to load side of the valve body, when the flow control means is in the second position, the diverters sealing the first and second channels for directing fluid from the process componentry into the drain output and out of the system for removing load side fluid from the process componentry.

9. The valve system of claim 8 wherein the shaft is provided with a flow diverter for each of the first and second channels, the shaft additionally provided with a plurality of channel seals extending perpendicularly to the longitudinal axis of the shaft, a channel seal interposed between the flow diverters and a channel seal located adjacent to each end of the shaft, the channel seals positioned on the shaft to prevent fluid from inadvertently entering the supply side channel and drain output when the shaft is in the first position for maintaining flow rate through the valve body.

10. The valve system of claim 8 further comprising:

the valve body having a purge input communicating with the load side outflow aperture and coupled to the purge media source for receiving purge media therefrom; and a check valve coupled to the purge input and to the purge media source, the check valve preventing purge media from backflowing toward the purge media source.

11. The valve system of claim 8 wherein the purge gas source emits gas into the load side of the valve body at a pressure ranging from approximately 40 p.s.i. to approximately 80 p.s.i.

12. The valve system of claim 8 wherein the purge media comprises nitrogen gas.

13. The valve system of claim 8 wherein the second pneumatic switch controls the duration of the purge process, the second switch first actuated to initialize the purge process and secondly actuated to terminate the purge process.

14. The valve system of claim 8 wherein said first and second channels are parallel to each other.

15. The valve system of claim 8 wherein the first and second channels are perpendicular to the valve body.

* * * * *